No. 861,988. PATENTED JULY 30, 1907.
M. L. JOHNSON.
VEHICLE.
APPLICATION FILED APR. 30, 1906.
2 SHEETS—SHEET 1.
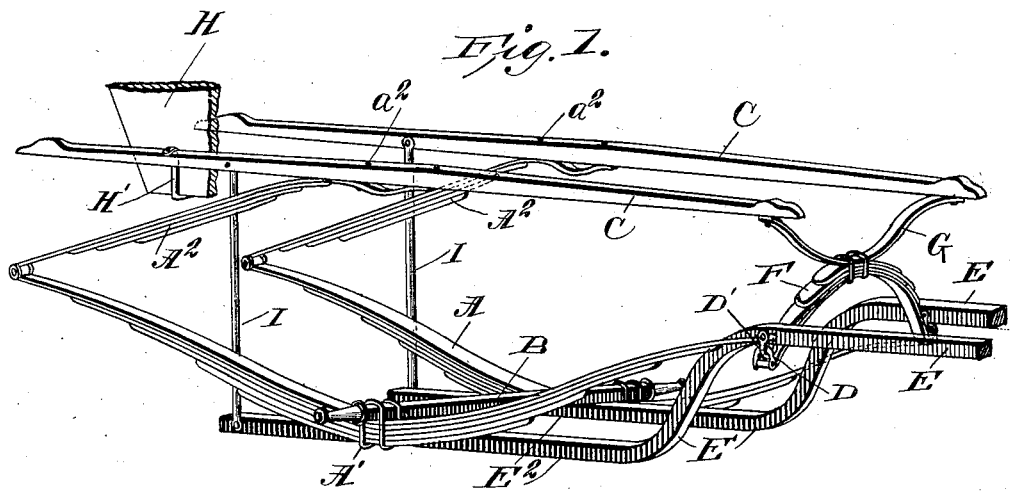
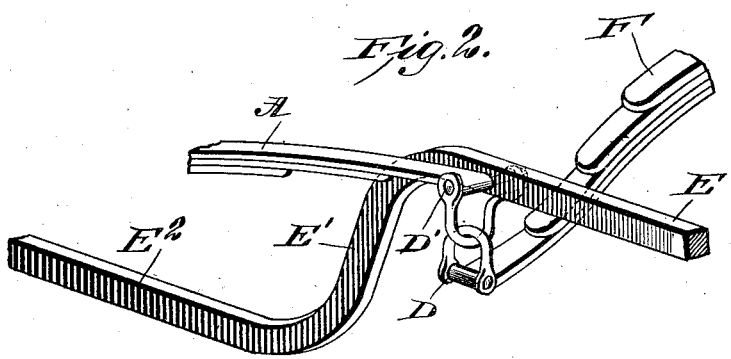
WITNESSES
INVENTOR
Madison L. Johnson
BY
ATTORNEYS No. 861,988.
PATENTED JULY 30, 1907.
M. L. JOHNSON.
VEHICLE.
APPLICATION FILED APR. 30, 1906.
2 SHEETS—SHEET 2.
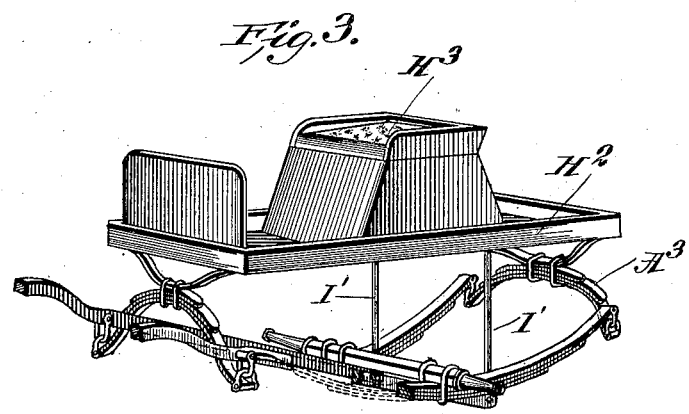
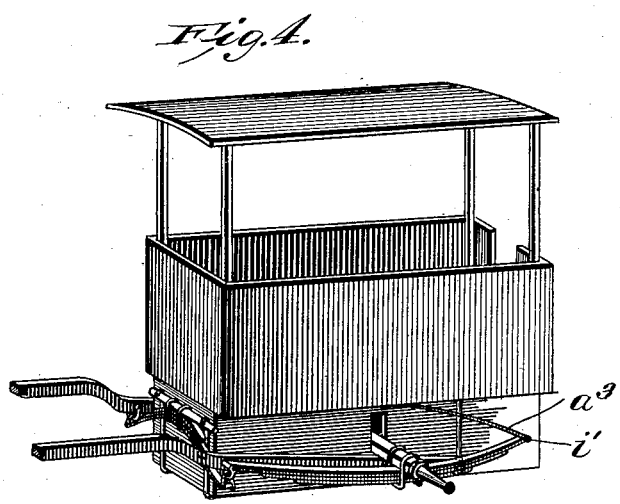
WITNESSES
INVENTOR
Madison L. Johnson
BY
ATTORNEYS

UNITED STATES PATENT OFFICE.

MADISON L. JOHNSON, OF GALENA, ILLINOIS.

VEHICLE.

No. 861,988.     Specification of Letters Patent.     Patented July 30, 1907.

Application filed April 30, 1906. Serial No. 314,412.

*To all whom it may concern:*

Be it known that I, MADISON L. JOHNSON, a citizen of the United States, and a resident of Galena, in the county of Jo Daviess and State of Illinois, have made certain new and useful Improvements in Vehicles, of which the following is a specification.

My invention is an improvement in vehicles and particularly in the class of two-wheeled vehicles, and has for an object to provide a novel construction whereby to eliminate as far as possible horse motion from the riders; and the invention consists in certain novel constructions and combinations of parts as will be hereinafter described and claimed.

In the drawings—Figure 1 is a perspective view of the running gear of a vehicle embodying my invention. Fig. 2 is a detail perspective view showing the connection between the shafts and the front and one of the side springs. Fig. 3 is a perspective view, partly broken away and partly shown in section of a somewhat different construction of vehicle from that shown in Fig. 1, and Fig. 4 shows a still different application of the broad principles of my invention.

In the construction shown in Fig. 1 the side springs A are clipped midway between their ends at A' to the axle B, are connected at their rear ends with the side springs $A^2$ which are secured at $a^2$ to the side bars C and at their front ends the springs A are secured by the shackles D to the shafts E and also connect with the ends of the front spring F, having a top spring G supporting the front ends of the side bars C. The side bars C support the body H, a part of which is shown in Fig. 1, by means of the brackets H' and the said side bars form a part of the intermediate devices between the rear ends of the shafts E and the body. The shafts E are secured to the front ends of the side springs A by means of the shackle bolts D' which extends through the shafts as best shown in Figs, 1 and 2 and thereby forms a pivotal connection between the shafts and the front ends of the side springs as shown in the said Figs. 1 and 2. Immediately in rear of the connection with the side springs the shafts are deflected downwardly at E' and thence have the rearwardly projecting portion or extension $E^2$, extending back below the axle B and to a point in rear of the axle and are connected at their rear ends by hanger rods I with the side bars C. These hangers also form a part of the intermediate devices between the rear ends of the shafts and the body as best shown in Fig. 1. I employ practically the same construction as that described, in the vehicle illustrated in Fig. 3, except that in Fig. 3 the rear upper springs $A^2$ are omitted and cross springs $A^3$ are provided for supporting the rear end of the body from the rear ends of the side springs and the hanger rods I' instead of connecting with side bars as in the construction shown in Fig. 1, connect directly with the body $H^2$ of the vehicle.

In the construction shown in Fig. 4 I illustrate a somewhat different form of body and in this construction the returned side springs $a^3$ instead of connecting with side bars as in Fig. 1, connect directly with the body and the hanger rods i' extend between the rear ends of the shafts and the body instead of connecting with intermediate side bars as in Fig. 1.

By my invention it will be noticed I give the horse a mechanical advantage by compounding the leverage of the shaft in making the draft direct from the spring gear and elastic to relieve the vehicle from horse motion.

In Figs. 1 and 2 I illustrate a pleasure vehicle with side bars and full coach gear; Fig. 3 illustrates my invention embodied in a full platform gear with covert body, while Fig. 4 illustrates a mail cart constructed in accordance with the invention on a full coach gear.

It will be noticed that I provide in connection with the axle of a two-wheeled vehicle two side springs rigidly attached with clips to the under side of the axle, the shafts extending below and beyond the axle and having their heels at both sides connected with hangers which extend up and are attached to the side spring bars in the construction shown in Fig. 1 and to bottom of the body when full platform with side entrance is used as shown in Fig. 3. It will also be noticed that the shafts and forward ends of the side springs are connected by the clevis and king-bolt of the shackle, the king-bolt passing through the shaft as best illustrated in Fig. 2 of the drawings. This connection at D, D' and the shackling of the ends of the front cross spring F forms a union between the cross and side springs at their juncture whereby the front cross spring is forced to take up and absorb all vibrations or horse motion that would otherwise be imparted to the body of the vehicle. The shaft heels are continued back and under the axle to a point midway between the axle and the rear ends of the side springs where they connect by means of intermediate devices with the body as illustrated and before described. By this construction the fulcrum is removed from the juncture of the cross and side springs with the shaft and is placed under the axle which is the true center of gravity of the vehicle thereby converting the shafts from a simple into a compound lever overcoming horse motion and giving the horse a mechanical advantage over his load in the vehicle.

The seat $H^3$ in the covert cart illustrated in Fig. 3 may be moved forward or back to aid in keeping the vehicle in perfect balance when other weights beside the driver's are carried. In the mail cart shown in Fig. 4 the driver has the choice of sitting or standing to the front or rear to keep the cart in perfect balance at all times whether loaded or empty.

I claim—

1. The combination in a vehicle substantially as described, of the axle, the coach side springs secured midway between their ends to the axle and having at their rear ends the upper sections extending forwardly, the side spring bars secured to the said upper sections, the front cross spring connected with the front ends of the side bars, the shackles connecting the ends of the front cross spring with the front ends of the side springs and having the king-bolts, the shafts secured by said king-bolts and extending thence rearwardly below the axle to a point about midway between the axle and the rear ends of the side springs and the hangers connecting the rear ends or heels of the shafts with the side bars all substantially as and for the purpose set forth.

2. The combination in a vehicle substantially as described of the side springs and the cross springs and connections between the same including a king-bolt extending horizontally from the front ends of the side springs through the shafts, the shafts being extended rearwardly, substantially as and for the purposes set forth.

3. The combination with the body and the axle, of a two-wheeled vehicle, of the side springs secured between their ends to the said axle, the shafts extending under and beyond the axle, intermediate devices between the rear ends of the shafts and the body including hangers projecting upwardly from the shafts, and connections between the front ends of the side springs and the shafts substantially as set forth.

4. A two-wheeled vehicle having a body a spring gear shafts attached to the spring gear as distinguished from being attached to the axle or body, said shafts extending in rear of the axle, means for supporting the body from the rear ends of the shafts, and means supporting the front end of the body from the spring gear.

5. The combination in a two-wheeled vehicle with the side springs, the axle and the body, of the shafts connected with the front ends of the side springs and extending thence below and rearwardly beyond the axle and devices connecting the rear ends of the shafts with the body, substantially as set forth.

6. The combination in a vehicle, substantially as described, of the side springs, the forward cross spring and the shafts, of the shackles between the ends of the forward spring and the side springs and king-bolts extending horizontally through the shafts and connecting the same with the front ends of the side springs, substantially as set forth.

7. The combination with the side spring bars, the side springs and the shafts connected with the front ends of the side springs and extending thence to a point in rear of the axle and about midway between the axle and the rear ends of the side springs and devices connecting the rear ends of the shafts with the side spring bars, substantially as set forth.

8. The combination of the body, the axle, the front cross spring, the side springs, the shafts, devices connecting the shafts with the side springs at the juncture of the latter with the front cross spring, the shafts being extended rearwardly from said connection beyond the axle and to a point about midway between the axle and the rear ends of the side springs and intermediate devices between the rear ends of the shafts and the body, substantially as set forth.

9. The combination in a two-wheeled vehicle with the axle and side springs secured between their ends thereto, of shafts connected with the front ends of the side springs and extending rearwardly therefrom below the axle and to a point in rear of the axle and hangers connected with the rear ends of the shafts, substantially as set forth.

MADISON L. JOHNSON.

Witnesses:
B. C. SAMPSON,
H. L. HEER.